Figure 1:
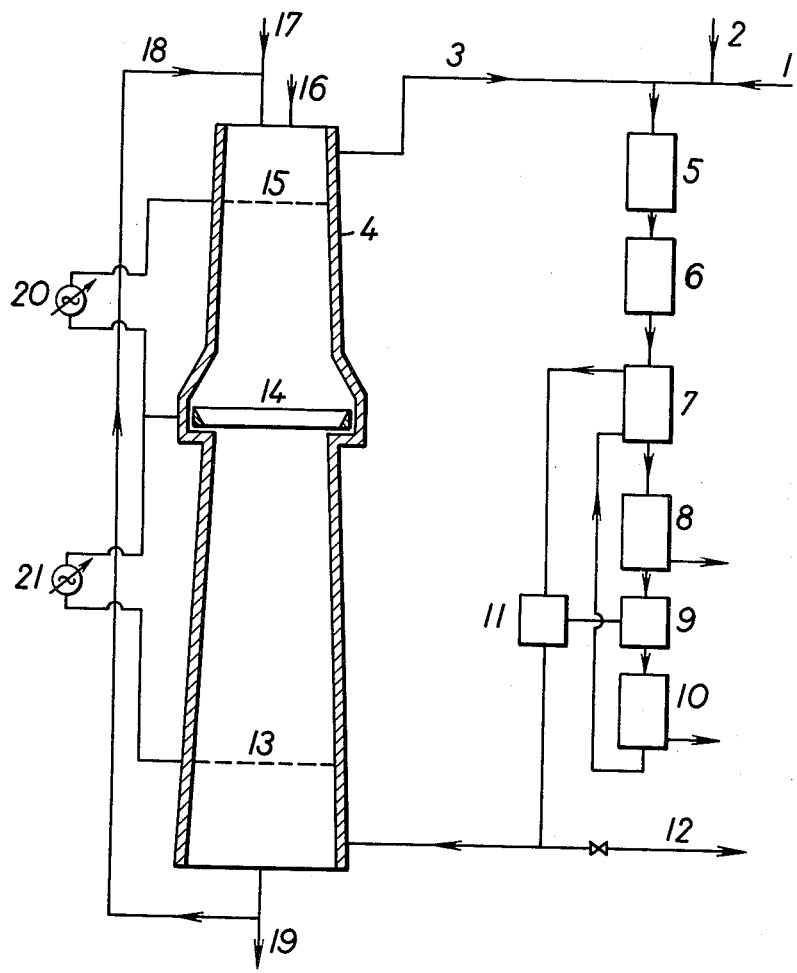

Dec. 23, 1958     O. JENSEN     2,865,732
PROCESS FOR THE PRODUCTION OF SPONGE IRON

Filed Dec. 26, 1956     2 Sheets-Sheet 1

INVENTOR
O. JENSEN

BY *Wenderoth, Lind & Ponack*
               Attys.

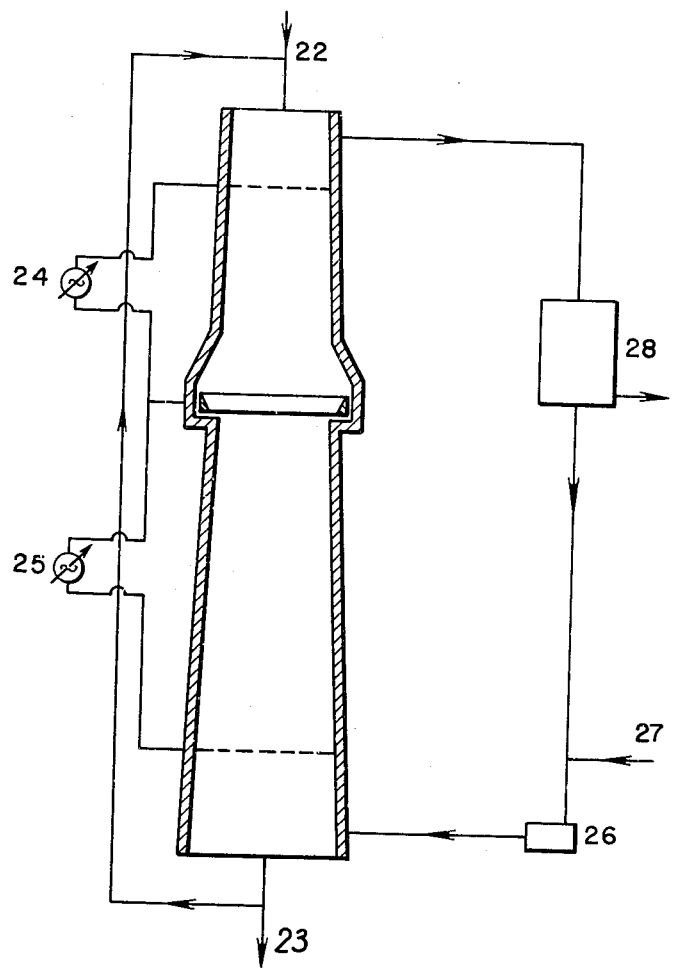

United States Patent Office 2,865,732
Patented Dec. 23, 1958

2,865,732
PROCESS FOR THE PRODUCTION OF SPONGE IRON

Olaf Jensen, Nordberg, Oslo, Norway, assignor to Norsk Hydro-Elektrisk Kvaelstofaktieselskab, Oslo, Norway Application December 26, 1956, Serial No. 630,567

Claims priority, application Sweden January 7, 1956

13 Claims. (Cl. 75—11)

The invention relates to a process for reduction of iron ore, preferably in the form of lump ore, pellets or otherwise agglomerated iron ore concentrate.

U. S. patent application Ser. No. 485,191 of January 31, 1955, now U. S. Patent No. 2,797,989, describes a process for the reduction of iron ore by means of a reducing gas which mainly contains hydrogen and carbon monoxide as reducing agents. The reduction process is effected in a vertical shaft furnace, heated by electric resistance heating, in which the iron ore moves downwards in the furnace in counter-current to the reducing gas, the ore being mixed with a substantial part of recirculated cooled sponge iron before it is fed into the top of the furnace, while at the same time the fresh gas is supplied to the furnace approximately at the middle part thereof.

It has been found, however, that certain types or ore, usually that which is poor in sulphur, i. e. contain less than 0.1% S, have a tendency to collapse or disintegrate if the reduction is effected, wholly or partially, at a temperature lower than about 800° C. With the process described above disintegration will tend to occur both before and after the maximal temperature (about 900° C.) has been reached. The disintegration may lead to so-called "hang" in the furnace shaft, especially at the upper and lower electrode and in the zone with maximal temperature, and may be particularly troublesome if the degree of reduction of the sponge iron is only 60-80% when it leaves the zone with maximal temperature.

The purpose of the process according to the present invention is to avoid the aforementioned disintegration, so that the process can be carried out satisfactorily also with types of ore which have a tendency to disintegrate during the reduction process.

The invention relates to a modification of the process according to U. S. patent application Ser. No. 485,191 of January 31, 1955, now U. S. Patent No. 2,797,989, the reduction being effected by means of gas which consists substantially of hydrogen and possibly carbon monoxide as reducing agent, and in which a substantial part of the completely reduced sponge iron, which is discharged from the bottom of the furnace, is recirculated to the top of the furnace in a cooled state together with unreduced iron ore.

The characteristic features of the modified process are that the reducing gas which is passed into the bottom of the furnace contains at least 90% hydrogen, calculated on the content of reducing components in the gas, and that the whole amount of reducing gas is passed into the furnace at the bottom in a cold state, the electrical energy being supplied to the furnace through three electrodes arranged about each other in the furnace shaft, and in such a manner that the zone between the two lower electrodes mainly serves for heating the reducing gases to the reaction temperature.

When the process is effected in the manner described above all inconvenient disintegration of the charge is avoided, and the risk of "hang" in the furnace is eliminated. Moreover, due to the fact that the carbon monoxide content of the reducing gas is kept below 10%, the effect is further obtained that the decomposition of carbon monoxide and precipitation of solid carbon in the temperature range 400-700° will not be so excessive that disintegration of the sponge iron will occur. The carbon content in the sponge iron will therefore not exceed 1%.

In certain cases we have found, further, that it is advantageous to keep the content of steam and carbon dioxide in the gas leaving the top of the furnace less than 35%, preferably about 25%, i. e., the amount (or velocity) of the reducing gas which is passed through the furnace is regulated in such manner that the volume of $H_2O+CO_2$ in the effluent gas in relation to the total volume of the effluent gas, containing $$H_2O+CO_2+H_2+CO$$

is less than 35%, for example only 15%, but preferably about 25%. The maximum content of steam and carbon dioxide in the gas will depend, inter alia, on the facility with which the ore can be reduced and its tendency to disintegrate.

If in spite of the aforementioned measures the ore cannot be heated with sufficient speed, for instance due to the dimensions of the furnace or unfavourable ratio of gas to supplied iron ore, we have, according to a further feature of the process, discovered that it is of advantage to add water together with the mixture of unreduced ore and recirculated sponge iron at the top of the furnace. In this embodiment the temperature of the charge in the upper part of the furnace is kept down until the water has evaporated and a sufficiently high temperature difference between the descending charge and ascending hot gas has been attained. As the increased content of steam in the gas, moreover, weakens its reducing power, the reaction velocity is kept down until the temperature has reached a sufficient height. If the co-content of the gas has to be lowered by the shift reaction $CO+H_2O$ (steam)$=CO_2+H_2$ before it is again passed into the furnace, the addition of water affords, moreover, the advantage that some of the heat of the reducing gas can be utilized for production of some of the steam needed for this reaction. If the addition of water is necessary, the amount of water will increase with the tendency of the iron ore to disintegrate.

The process according to the invention can also be effected with fresh gas containing more than 10% carbon monoxide. In this case we have found it advantageous to mix the fresh gas with gas withdrawn from the top of the furnace, if desired after addition of a further quantity of steam for the shift reaction, whereupon the gas mixture is passed into a shift reactor and thereafter freed from most of its content of steam and carbonic acid before being passed into the bottom of the furnace.

As will appear from the above description of the process according to the invention, the reduction furnace has two current-carrying zones, namely between the upper and middle electrode, and between the latter electrode and the lower electrode. As the process according to the invention is effected in such a way that the ore is practically speaking completely reduced when it gets on a level with the middle electrode, which preferably has the form of an annular electrode, it will only be the upper current zone which furnishes the heat required for the reduction process itself. The lower current zone serves therefore essentially for preheating the gas which is passed into the bottom of the furnace, if the descending quantity of sponge iron is not sufficient to bring the reducing gas right up to the reaction temperature. The upper and lower electrodes are preferably given the form of grid electrodes, through which the ore agglomerates may pass smoothly.

If, for example, water gas is used for the reduction process, this must first be partially converted and washed under pressure in order to obtain a hydrogen content exceeding 90%, calculated on the reducing constituents of the gas. The gas emerges therefore from the pressure washer at normal cooling water temperature. Instead of heating this volume of gas to a temperature of about 900° C. in a separate unit before it is passed into the middle part of the reduction furnace, we have found that it will most frequently be easier to utilize the lower current zone of the reduction furnace for obtaining the extra amount of energy required for bringing the total volume of reducing gas up to reaction temperature (approximately 900° C.).

The reduction process can of course be effected also with pure hydrogen, and with this gas the heat exchange, due to the high heat conductivity of hydrogen, is so high that any addition of water at the top of the furnace together with the iron ore will normally not afford any advantages. However, if water is added at the top of the furnace, the amount of recirculated reduced sponge iron must be reduced. This will have the effect that the energy requirements for the lower current zone must be increased, because the zone is being supplied with insufficient amounts of hot sponge iron to afford enough heat to the incoming gases.

The amount of reduced sponge iron recirculated to the top of the furnace is normally regulated in such a manner that the gas withdrawn from the top of the furnace attains a temperature of between 100 and 200° C. If, however, to obtain a quicker heating period for the ore, it becomes necessary to increase the volume of the reducing gas, it has been found advisable, as already mentioned, to replace part of the returned amount of sponge iron by water, which is evaporated in the upper part of the furnace.

The process of this invention may be further understood from the following examples which are given by way of illustration and are not intended as a limitation of the invention.

In the first example the reduction of the iron ore is carried out by means of water gas, produced and treated in such a manner that the gas contains a very high content of hydrogen.

In the second example the reduction is carried out with hydrogen produced by electrolytic decomposition of water.

Fig. 1 is a diagrammatic illustration of a unit for carrying out the process according to the invention; and Fig. 2 is a diagrammatic showing of an apparatus for carrying out the process according to the invention in a slightly different manner.

EXAMPLES

1. Reduction by means of water gas

It is postulated that the water gas be produced in a per se familiar way, for instance, by total gasification of coal or oil by means of oxygen and steam.

The iron ore used is in the form of pellets, practically free from sulphur (66.5% Fe, 0.005% S), which has a strong tendency to disintegrate by reduction at temperatures less than 800° C.

The process according to the example will be described with reference to Figure 1. All the figures stated apply to the same time unit (for example, per hour).

Water gas containing 324 Nm.$^3$CO, 312 Nm.$^3$H$_2$, 137 Nm.$^3$CO$_2$, 4 Nm.$^3$CH$_4$, 4 Nm.$^3$N$_2$, besides 160 kg. H$_2$O vapor, comes from the coal or oil gasification apparatus at a temperature of about 1000° C. The gas passes a dust separator, where coarse dust, un-gasified coal and ash are removed, after which the gas is cooled to about 200° C. by injecting 313 kg. water 2, before being mixed with the recirculated gas 3 from the top of the reduction furnace 4.

Via an electro-filter 5 for removal of fine dust the gas is conducted to the shift reactor 6, where 321 Nm.$^3$ of the CO content of the gas reacts with H$_2$O in the form of steam with the formation of 321 Nm.$^3$H$_2$ and 321 Nm.$^3$CO$_2$.

From the shift reactor 6 the gas is led, at a temperature of 270° C. to a heat exchanger 7 and onwards to a condenser 8, where the gas (237 Nm.$^3$CO, 2709 Nm.$^3$H$_2$, 543 Nm.$^3$CO$_2$, 328 Nm.$^3$N$_2$ and 4 Nm.$^3$CH$_4$) is cooled down to room temperature, whereby most of its content of steam is condensed and removed (1070 kg. H$_2$O).

The gas is then compressed to 25 kg./cm.$^2$ in the compressor 9, freed from 457 Nm.$^3$CO$_2$ (and hydrogen sulphide) in the pressure washer 10 and heated to about 170° C. in the heat exchanger 7 before the gas is expanded and cooled in the turbine 11 and passed into the bottom of the furnace at a temperature of about 20° C. and containing 234 Nm.$^3$CO, 2676 Nm.$^3$H$_2$, 85 Nm.$^3$CO$_2$, 324 Nm.$^3$N$_2$, 4 Nm.$^3$CH$_4$ and 85 Nm.$^3$H$_2$O vapor. It is postulated that a gas volume of 42 Nm.$^3$ (3 Nm.$^3$CO, 33 Nm.$^3$H$_2$, 1 Nm.$^3$CO$_2$ and 1 Nm.$^3$H$_2$O) will be removed from the system as tail gas 12.

The gas which is passed into the bottom of the furnace cools down the outgoing reduced sponge iron, and will in the lower current zone, between the grid electrode 13 and the annular electrode 14, be heated to the reaction temperature (approximately 900° C.). In the upper current zone, between the annular electrode 14 and the upper grid electrode 15, the reaction between the iron ore and the reducing gas takes place. The gas leaves the top of the furnace at a temperature of approximately 200° C., containing steam produced by the reaction and by the evaporation of 375 kg. H$_2$O 16, which is charged to the furnace top together with ore 17 and returned sponge iron 18.

The effluent gas 3 from the furnace top contains 234 Nm.$^3$CO, 2076 Nm.$^3$H$_2$, 85 Nm.$^3$CO$_2$, 324 Nm.$^3$N$_2$, besides 923 kg. steam, and is mixed with the fresh water gas as described above.

At the top of the furnace 1600 kg. iron ore 17 in the form of pellets is mixed with 1725 kg. recirculated sponge iron 18, before the mixture is charged to the furnace top. From the furnace bottom is withdrawn 1160 kg. sponge iron 19, containing altogether 91.5% Fe, whereof 86.0% as metallic iron having a carbon content of 0.5%.

The requisite electrical energy is supplied to the upper and lower current zone of the furnace from two single-phase transformers 20 and 21 with voltage adjustment of 300 and 750 kw. respectively.

The compressor 9 consumes about 600 kw., of which about 300 kw. is derived from the expansion turbine 11.

The consumption of coal and energy will appear from the following table:

| Processes requiring energy | kg. coal | kwh. |
|---|---|---|
| Gas production: | | |
| (a) Coal | 380 | |
| (b) 320 kg. H$_2$O vapor | 40 | |
| (c) 200 Nm $^3$O$_2$ | | 120 |
| Reduction furnace | | 1,050 |
| Compressor minus expansion turbine | | 300 |
| Consumption per ton met. iron | 420 | 1,470 |

If the electrical energy is derived from a coal fired electric power station with a consumption of 0.5 kg. coal per kwh., the total coal consumption will be 1155 kg. per ton metallic iron.

2. Reduction by means of hydrogen

The process according to the example will be described with reference to Figure 2.

The hydrogen is produced by electrolytic decomposition of water, and the iron ore is of the same type as mentioned in Example 1.

At the furnace top 1600 kg. of pellets 22 is mixed with 2700 kg. recirculated sponge iron, and the mixture is charged to the top of the furnace shaft. From the bottom of the furnace is withdrawn 1160 sponge iron 23 containing altogether 91.5% Fe, whereof 86% in the form of metallic iron. The supply of electrical energy to the upper and lower current zone is effected via two one-phase transformers 23 and 25 with voltage adjustment of 325 and 350 kw. respectively.

To the furnace bottom there is conducted by means of the circulating fan 25 2665 Nm.³H₂, containing 49 kg. steam, of which 650 Nm.³H₂+12 kg. steam is supplied from the electrolysis unit 27 as fresh gas. The gas passes through the shaft in counter-current to the descending sponge iron, and is heated to reaction temperature in the lower current zone, with the result that reduction of the iron ore is effected mainly in the upper current zone.

From the top of the furnace there is withdrawn at about 150° C. 2005 Nm.³H₂, containing 531 kg. steam, whereof 494 kg. water is condensed and removed in the condenser 28 before the circulating gas is mixed with the fresh gas 27 supplied from the electrolysis unit, and is returned via the circulating fan to the bottom of the furnace.

The consumption of energy will be seen from the following table:

| Process requiring energy: | Kwh. |
| --- | --- |
| Production of 650 Nm.³H₂ | 3250 |
| Reduction furnace | 675 |
| Circulating fan | 75 |
| Total consumption per ton met. iron | 4000 |

Even in this example all numbers are calculated per hour.

The invention is of course not limited to the embodiments shown in these two examples, but can be varied according to the type of iron ore or gas mixture which it is desired to use in the reduction process.

In accordance with one further embodiment the process is effected at elevated pressure, preferably at a pressure of about 25 kg. per cm.² (about 355 lbs. sq. inch.). If the process is effected as described above in the examples, using atmospheric pressure in the reduction furnace, the capacity of the furnace will be determined by the velocity at which the reducing gas can be carried through the furnace shaft without the drop in pressure through the furnace being too great. A gas velocity calculated on the free shaft cross section, of about 5 m./sec., can in general be taken as the upper limit.

If, however, the process is carried out at an elevated pressure, the capacity of the reduction furnace will be increased, while the requisite gas volume, and thereby the gas velocity, is reduced.

Since reduction of iron ore with hydrogen is effected according to the equation Fe₂O₃+3H₂=2Fe+3H₂O, it will be seen that the theoretical equilibrium is not affected by change of pressure. On the other hand the reaction speed increases with the pressure, whereby the practically attainable equilibrium approximates the theoretical, which in its turn has the effect that the necessary volume of gas in circulation in the reduction furnace becomes less.

Production of water gas by total gasification of coal or oil with oxygen and steam is effected according to the latest methods at a pressure of about 25 kg./cm.². At this pressure carbon dioxide can also be removed from the gas by absorption in water. It is therefore of special advantage also to effect the reduction of iron ore by means of water gas or more or less pure hydrogen at this pressure. Assuming that the gas velocity in the reduction furnace can at the most be raised to 1 m./sec. at 25 atm., the volume of gas which can be passed through the furnace at this pressure will be about 5 times as much as at atmospheric pressure, whereby also the capacity of the furnace is correspondingly increased. Likewise compression of the circulating gas, with subsequent expansion, for washing carbonic acid out of the gas, is eliminated. Conversion of the water gas, i. e. the catalytic conversion of carbon monoxide and steam in the gas to hydrogen and carbon dioxide can likewise be effected under pressure, which also affords several practical advantages.

I claim:

1. A process for reduction of iron ore in the form of lump ore, pellets or otherwise agglomerated iron ore concentrate, which has a tendency to disintegrate during the reaction, with gas consisting of hydrogen and carbon monoxide as a reducing agent, said reducing gas consisting of fresh gas and circulatory gas from which substantially all of the oxidizing products formed during the reaction with the iron ore have been removed before being re-introduced into the process, in a vertical shaft furnace, heated by means of electric resistance heating, the iron ore moving downwards in said furnace in countercurrent to said reducing gas ascending through the furnace, the ore being mixed with a substantial part of recirculated cooled sponge iron before charging the ore to the top of the furnace, that improvement comprising introducing the whole amount of reducing gas at the lower end of the furnace in a cold state, said reducing gas containing at least 90% hydrogen, calculated on the content of reducing components in the gas, supplying the electrical energy to the furnace at three vertically spaced points, and heating the reducing gas to reaction temperature in the zone between the two lower points.

2. A process according to claim 1, including the step of carrying out the process at superatmospheric pressure.

3. A process as claimed in claim 1, including the step of carrying out the process at a superatmospheric pressure of about 25 kg. per cm.²

4. A process according to claim 1, including the step of passing the reducing gas through the furnace in such excess in relation to the iron ore passing through the shaft furnace that the content of steam and carbon dioxide in the gas leaving the top of the furnace is between 15 and 35%.

5. A process according to claim 4, including the step of carrying out the process at superatmospheric pressure.

6. A process according to claim 1, including the step of mixing small amounts of water with the iron ore and recirculated cooled sponge iron before charging to the top of the furnace.

7. A process according to claim 6, including the step of carrying out the process at superatmospheric pressure.

8. A process according to claim 1, wherein the fresh gas contains more than 10% carbon monoxide, calculated on the content of reducing components in the gas, and including the steps of mixing the fresh gas with the gas effluent from the upper part of the furnace, passing the gas mixture into a shift reactor, and removing most of the remaining content of steam and carbon dioxide from the mixture before it is passed into the lower part of the furnace.

9. A process according to claim 8, including the step of carrying out the process at superatmospheric pressure.

10. A process according to claim 8, including the step of adding further quantities of steam, needed for conversion of said gas mixture in the shift reactor, to the mixture of fresh gas and gas effluent.

11. A process according to claim 10, including the step of carrying out the process at superatmospheric pressure.

12. A process for reduction of iron ore in the form of lump ore, pellets or otherwise agglomerated iron ore concentrate, which has a tendency to disintegrate during the reaction, with a gaseous reducing agent, in a vertical shaft furnace, heated by means of electric resistance heating, the iron ore moving downwards in said furnace in countercurrent to said reducing gas ascending through the furnace, the ore being mixed with a substantial part of recirculated cooled sponge iron before charging the ore to the top of the furnace, that improvements comprising the steps of introducing the reducing gas at the lower end of the furnace in the cold state, said reducing gas consisting of hydrogen produced by electrolytic decomposition of water, supplying the electric energy to the furnace at three vertically spaced points heating the reducing gas to reaction temperature in the zone between the two lower points, and removing the substantial amount of water formed during the reaction with the ore from the gas effluent before the gas effluent is re-introduced into the furnace together with fresh quantities of hydrogen.

13. A process according to claim 12, including the step of carrying out the process at superatmospheric pressure.

References Cited in the file of this patent

UNITED STATES PATENTS

| | | |
|---|---|---|
| 2,080,028 | Avery | May 11, 1937 |
| 2,142,100 | Avery | Jan. 3, 1939 |
| 2,786,747 | Gallusser | Mar. 26, 1957 |
| 2,181,471 | Seller | Jan. 28, 1958 |